(12) United States Patent
Spyrou et al.

(10) Patent No.: US 7,709,589 B2
(45) Date of Patent: May 4, 2010

(54) LOW TEMPERATURE CURABLE POLYURETHANE COMPOSITIONS CONTAINING URETDIONE GROUPS

(75) Inventors: Emmanouil Spyrou, Dorsten (DE); Holger Loesch, Herne (DE); Dirk Hoppe, Nottuln (DE)

(73) Assignee: Evonik Degussa GmbH, Essen (DE)

( * ) Notice: Subject to any disclaimer, the term of this patent is extended or adjusted under 35 U.S.C. 154(b) by 1059 days.

(21) Appl. No.: 10/958,357

(22) Filed: Oct. 6, 2004

(65) Prior Publication Data

US 2005/0096450 A1 May 5, 2005

(30) Foreign Application Priority Data

Oct. 9, 2003 (DE) ................................ 103 46 958

(51) Int. Cl.
*C08G 18/81* (2006.01)

(52) U.S. Cl. .................... 528/45; 427/385.5; 428/423.1; 428/423.4; 428/425.1; 428/425.8; 525/123; 525/124; 525/424; 525/440; 525/453; 528/52; 528/53; 528/54; 528/60; 528/65; 528/66; 528/73; 528/76; 528/80; 528/85

(58) Field of Classification Search .................... 528/45, 528/52, 53, 54, 60, 65, 66, 73, 76, 80, 85; 525/123, 124, 424, 440, 453; 428/423.1, 428/423.4, 425.1, 425.8; 427/385.5
See application file for complete search history.

(56) References Cited

U.S. PATENT DOCUMENTS

| 4,503,226 A | * | 3/1985 | Tang et al. ................... 544/193 |
| 5,614,323 A | | 3/1997 | Chang |
| 5,728,789 A | * | 3/1998 | Wamprecht et al. ......... 526/271 |
| 5,753,733 A | | 5/1998 | Eck et al. |
| 5,786,419 A | * | 7/1998 | Meier-Westhues et al. .. 524/590 |
| 6,914,115 B2 | | 7/2005 | Spyrou et al. |
| 2003/0153713 A1 | * | 8/2003 | Spyrou et al. ................. 528/48 |
| 2004/0219367 A1 | | 11/2004 | Spyrou et al. |
| 2005/0003206 A1 | | 1/2005 | Spyrou et al. |
| 2005/0090627 A1 | | 4/2005 | Wenning et al. |
| 2005/0090636 A1 | | 4/2005 | Wenning et al. |
| 2005/0119437 A1 | | 6/2005 | Wenning et al. |
| 2005/0239956 A1 | | 10/2005 | Spyrou et al. |
| 2005/0239992 A1 | | 10/2005 | Spyrou et al. |

FOREIGN PATENT DOCUMENTS

| DE | 196 16 496 A1 | 10/1997 |
| EP | 0 045 994 B1 | 2/1982 |
| EP | 1 334 987 A2 | 8/2003 |
| EP | 1 362 873 A1 | 11/2003 |
| WO | WO 00/34355 | 6/2000 |

OTHER PUBLICATIONS

U.S. Appl. No. 10/591,815, filed Sep. 6, 2006, Spyrou.
U.S. Appl. No. 10/958,469, filed Oct. 6, 2004, Spyrou.
U.S. Appl. No. 11/576,851, filed Apr. 6, 2007, Spyrou, et al.
U.S. Appl. No. 10/591,814, filed Sep. 6, 2006, Spyrou, et al.
U.S. Appl. No. 11/576,703, filed Apr. 5, 2007, Spyrou, et al.
U.S. Appl. No. 11/722,740, filed Jun. 25, 2007, Spyrou, et al.
U.S. Appl. No. 11/909,098, filed Sep. 19, 2007, Spyrou, et al.
U.S. Appl. No. 11/909,549, filed Sep. 24, 2007, Weiss, et al.

* cited by examiner

*Primary Examiner*—John Cooney
(74) *Attorney, Agent, or Firm*—Oblon, Spivak, McClelland, Maier & Neustadt, L.L.P.

(57) ABSTRACT

The invention relates to high-reactivity polyurethane compositions. The invention further relates to low temperature curable polyurethane compositions which contain uretdione groups, particularly useful for polyurethane powder coating compositions and adhesive compositions, and to processes for preparing and using the same.

27 Claims, No Drawings

LOW TEMPERATURE CURABLE POLYURETHANE COMPOSITIONS CONTAINING URETDIONE GROUPS

FIELD OF THE INVENTION

The invention relates to high-reactivity polyurethane compositions. The invention further relates to low temperature curable polyurethane compositions containing uretdione groups, to processes for preparing the same, and to their use. These compositions are particularly suitable for polyurethane coating compositions, for example powder coatings, and adhesive compositions.

BACKGROUND OF THE INVENTION

Externally or internally blocked polyisocyanates which are solid at room temperature, are valuable crosslinkers for thermally crosslinkable polyurethane (PU) powder coating compositions and adhesive compositions. For instance, DE-A 27 35 497 describes PU powder coatings having outstanding weathering stability and thermal stability. The crosslinkers described in DE-A 27 12 931 are composed of ε-caprolactam-blocked, isophorone diisocyanate-containing isocyanurate groups. Also known are polyisocyanates containing urethane, biuret or urea groups, whose isocyanate groups are likewise blocked.

The drawback of these externally blocked systems lies in the elimination of the blocking agent during the thermal crosslinking reaction. Since the blocking agent may be emitted into the environment, it is necessary to take particular measures to clean outgoing air discharges and to recover the blocking agent. This necessity arises out of ecological and workplace safety concerns. The crosslinkers, moreover, are of low reactivity, requiring curing temperatures above 170° C.

References DE-A 30 30 539 and DE-A 30 30 572 describe processes for preparing polyaddition compounds which contain uretdione groups, and whose terminal isocyanate groups are irreversibly blocked with monoalcohols or mono amines. Particular drawbacks are the chain-terminating constituents of the crosslinkers, which lead to low network densities in the PU powder coatings, and hence to moderate solvent resistances.

Hydroxyl-terminated polyaddition compounds containing uretdione groups are disclosed in EP 0 669 353. Because of their functionality of two, they exhibit improved resistance to solvents. Powder coating compositions based on these polyisocyanates containing uretdione groups, share the feature that, during the curing reaction, they do not emit any volatile compounds. However, the curing temperatures are at a high level, not less than 180° C.

The use of amidines as catalysts in PU powder coating compositions is described in EP 0 803 524. Although these catalysts do lead to a reduction in the curing temperature, they exhibit considerable yellowing, which is generally unwanted in the coatings sector. The cause of this yellowing is presumed to be the reactive nitrogen atoms in the amidines, which are able to react with atmospheric oxygen to form N-oxides, which in turn, are responsible for the discoloration. Reference EP 0 803 524 also mentions other catalysts which have been used to date for this purpose, but does not indicate any particular effect of these catalysts on the curing temperature. Such catalysts include the organometallic catalysts known from polyurethane chemistry, such as dibutyltin dilaurate (DBTL), or tertiary amines, such as 1,4-diazabicyclo[2.2.2]octane (DABCO), for example.

Reference WO 00/34355 discloses catalysts based on metal acetylacetonates, such as zinc acetylacetonate, for example. Such catalysts are actually capable of lowering the curing temperature of polyurethane powder coating compositions containing uretdione groups, but their reaction products are principally allophanates (M. Gedan-Smolka, F. Lehmann, D. Lehmann "New Catalysts for the Low Temperature Curing of Uretdione Powder Coatings" *International Waterborne, High solids and Powder Coatings Symposium*, New Orleans, Feb. 21-23, 2001). Allophanates are the reaction products of one mole of alcohol and two moles of isocyanate, whereas in the conventional urethane chemistry, one mole of alcohol reacts with one mole of isocyanate. As a result of the unwanted formation of allophanate, therefore, isocyanate groups, valuable both technically and economically, are destroyed.

Therefore an object of the present invention is to find high-reactivity polyurethane compositions containing uretdione groups; these compositions being curable even at very low temperatures, and being particularly suitable for producing plastics and high-gloss or matt, light-stable and weather-stable powder coatings and adhesives. Surprisingly, it has been found that certain catalysts so greatly accelerate the unblocking of uretdione groups, that when uretdione-group-containing curing agents are used, it is possible to achieve a considerable reduction in the curing temperature of powder coating compositions or adhesive compositions.

Conventional uretdione-containing coating compositions and adhesive compositions can be cured only at 180° C., or above, under normal conditions (for example, DBTL catalysis). With the aid of the low-temperature-curing coating compositions and adhesive compositions of the invention, it is possible, to have curing temperatures of about 100 to about 160° C., including all temperatures in between, which not only saves on energy and cure time, but also allow for the coating or bonding of many temperature-sensitive substrates, which otherwise if treated at 180° C., or above, would give rise to unwanted yellowing, decomposition and/or embrittlement phenomena. Besides metal, glass, wood, leather, plastics, and MDF board, certain aluminum substrate work very well with the compositions of the invention. Moreover, it is noted that in the case of the aluminum substrates, an excessively high temperature load may sometimes leads to an unwanted change in the crystal structure. A heat-resistant substrate can withstand the temperature(s) at which a coating is applied and cured, without undergoing unwanted changes in shape, color and/or composition.

SUMMARY OF THE INVENTION

Accordingly, one object of the invention is to provide high-reactivity polyurethane compositions.

Another object of the invention is to provide high-reactivity polyurethane compositions containing uretdione groups.

Another object of the invention is to provide high-reactivity polyurethane compositions containing uretdione groups, which cure at low temperatures.

Another object of the invention is to provide polyurethane compositions for coatings on metal, plastic, glass, wood or leather substrates, other heat-resistant substrates, or combinations thereof.

Another object of the invention is to provide polyurethane compositions for the adhesive bonding of metal, plastic, glass, wood or leather substrates, other heat-resistant substrates, or combinations thereof.

Another object of the invention is to provide processes for the preparation of high-reactivity polyurethane compositions.

Another object of the invention is to provide processes for the preparation of high-reactivity polyurethane compositions containing uretdione groups.

Another object of the invention is to provide processes for the preparation of high-reactivity polyurethane compositions containing uretdione groups, which cure at low temperatures.

Another object of the invention is to provide metal, plastic, glass, wood or leather substrates, other heat-resistant substrates, or combinations thereof, containing one or more polyurethane compositions.

Another object of the invention is to provide articles containing one or more metal, plastic, glass, wood or leather substrates, other heat-resistant substrates, or combinations thereof, containing one or more polyurethane compositions.

Another object of the invention is to provide metal-coating compositions, particularly for automobile bodies, motorbikes and cycles, architectural components and household appliances; wood-coating compositions; glass-coating compositions; leather-coating compositions; and plastics-coating compositions.

These and other objects of the invention have been satisfied, either individually or in combinations thereof, by the discovery of a polyurethane composition, comprising:
A) at least one hardener or curing agent which contains uretdione groups, and is derived from aliphatic, (cyclo)aliphatic, cycloaliphatic, or aromatic polyisocyanates, or mixtures thereof, and one or more hydroxyl-containing compounds, and has a free NCO content of less than about 5% by weight, based on the total weight of component A), and a uretdione content of from about 1% to about 18% by weight, based on the total weight of component A);
B) one or more catalysts selected from the group consisting of
  1) catalysts of the formula $[NR^1R^2R^3R^4]^+[R^5COO]^-$, where $R^1$ to $R^4$ are each independently, an alkyl, aryl, aralkyl, heteroaryl or alkoxyalkyl radical having 1 to 18 carbon atoms, including, but not limited to, one or more radicals having 1, 2, 3, 4, 5, 6, 7, 8, 9, 10, 11, 12, 13, 14, 15, 16, 17 and 18 carbon atoms, and in each case are independently linear or branched, unbridged or bridged with one or more other radicals $R^1$, $R^2$, $R^3$ and $R^4$, to form a monocyclic, bicyclic or tricyclic system, and where the bridging atom(s) optionally include not only carbon, but also heteroatoms, and additionally, each radical $R^1$, $R^2$, $R^3$ and $R^4$, optionally has one or more alcohol, amino, ester, keto, thio, urethane, urea or allophanate groups, double bonds, triple bonds or halogen atoms, or mixtures thereof; and where $R^5$ is an alkyl, aryl, aralkyl, heteroaryl or alkoxyalkyl radical having 1 to 18 carbon atoms, including, but not limited to, 1, 2, 3, 4, 5, 6, 7, 8, 9, 10, 11, 12, 13, 14, 15, 16, 17 and 18 carbon atoms, and where $R^5$ is linear or branched, and additionally, optionally has one or more alcohol, amino, ester, keto, thio, acid, urethane, urea or allophanate groups, double bonds, triple bonds or halogen atoms or mixtures thereof;
  2) catalysts of the formula $[NR^1R^2R^3R^4]^+[R^5]^-$, where $R^1$ to $R^4$ are each independently, an alkyl, aryl, aralkyl, heteroaryl or alkoxyalkyl radical having 1 to 18 carbon atoms, including, but not limited to, radicals having 1, 2, 3, 4, 5, 6, 7, 8, 9, 10, 11, 12, 13, 14, 15, 16, 17 and 18 carbon atoms, and in each case are independently linear or branched, unbridged or bridged with one or more other radicals $R^1$, $R^2$, $R^3$ and $R^4$, to form a monocyclic, bicyclic or tricyclic system, and where the bridging atom(s) optionally include not only carbon, but also heteroatoms, and additionally, each radical $R^1$, $R^2$, $R^3$ and $R^4$, optionally has one or more alcohol, amino, ester, keto, thio, acid, urethane, urea or allophanate groups, double bonds, triple bonds or halogen atoms, or mixtures thereof; and where $R^5$ is either OH or F;
  3) catalysts of the formula $M(OR^1)_n(OR^2)_m(OR^3)_o(OR^4)_p(OR^5)_q(OR^6)_r$, where M is a metal in any positive oxidation state, and is identical to the sum n+m+o+p+q+r, where each of n, m, o, p, q, and r is an integer from 0 to 6, such that n+m+o+p+q+r=1 to 6, and where the radicals $R^1$ to $R^6$ are each independently, hydrogen or an alkyl, aryl, aralkyl, heteroaryl or alkoxyalkyl radical having 1 to 8 carbon atoms, including, but not limited to, radicals having 1, 2, 3, 4, 5, 6, 7 and 8 carbon atoms, and where the radicals may independently be linear or branched, unbridged or bridged with one or more other radicals, $R^1$, $R^2$, $R^3$, $R^4$, $R^5$ and $R^6$, to form a monocyclic, bicyclic or tricyclic system, and where the bridging atom(s) may optionally, in addition to carbon, also be heteroatoms, and wherein each of $R^1$, $R^2$, $R^3$, $R^4$, $R^5$ and $R^6$, optionally has one or more alcohol, amino, ester, keto, thio, acid, urethane, urea or allophanate groups, double bonds, triple bonds or halogen atoms, or mixtures thereof; and
  4) mixtures thereof;
C) optionally, at least one hydroxyl-containing polymer having an OH number between about 20 and about 500 mg KOH/gram, at least one amino-containing polymer having a comparable amine content, or mixtures thereof;
D) optionally, at least one compound which is reactive toward acid groups, and has a weight fraction, based on the total formulation or composition, from about 0.1% to about 10%;
E) optionally, one or more acids in monomeric form, polymeric form or mixtures thereof, in a weight fraction, based on the total formulation or composition, from about 0.1% to about 10%; and
F) optionally, one or more auxiliaries, additives, or mixtures thereof; and where the fraction of the one or more catalysts under B) is from about 0.001% to about 5%, by weight of the total amount of the components, and where the composition has a melting point above about 40° C.

The two components A), and, when present, C), are present in a proportion, such that for each hydroxyl and/or amine group of component C), there is more than 1 uretdione group of component A). Optionally the catalysts from the above groups 1 to 4 can be surrounded by, or mixed within, an inert shell, and hence encapsulated.

The invention also provides polyurethane compositions containing one or more catalysts selected from the groups of catalysts 1) to 4) as discussed above, and processes for preparing the same.

DETAILED DESCRIPTION OF THE PREFERRED EMBODIMENTS

The invention provides high-reactivity, curable polyurethane compositions, comprising:
A) at least one hardener or curing agent which contains uretdione groups, and is derived from aliphatic, (cyclo)aliphatic, cycloaliphatic, or aromatic polyisocyanates, or mixtures thereof, and one or more hydroxyl-containing compounds, and has a free NCO content of less than about 5% by weight and a uretdione content of from about 1% to about 18% by weight, these weight percents being based on the total weight of compound A);

B) one or more catalysts selected from the group consisting of
1) catalysts of the formula $[NR^1R^2R^3R^4]^+[R^5COO]^-$, where $R^1$ to $R^4$ are each independently, an alkyl, aryl, aralkyl, heteroaryl or alkoxyalkyl radical having 1 to 18 carbon atoms, including, but not limited to, one or more radicals having 1, 2, 3, 4, 5, 6, 7, 8, 9, 10, 11, 12, 13, 14, 15, 16, 17 and 18 carbon atoms, and in each case are independently linear or branched, unbridged or bridged with one or more other radicals $R^1$, $R^2$, $R^3$ and $R^4$, to form a monocyclic, bicyclic or tricyclic system, and where the bridging atom(s) optionally include not only carbon, but also heteroatoms, and additionally, each radical $R^1$, $R^2$, $R^3$ and $R^4$, optionally has one or more alcohol, amino, ester, keto, thio, urethane, urea or allophanate groups, double bonds, triple bonds or halogen atoms, or mixtures thereof; and where $R^5$ is an alkyl, aryl, aralkyl, heteroaryl or alkoxyalkyl radical having 1 to 18 carbon atoms, including, but not limited to, 1, 2, 3, 4, 5, 6, 7, 8, 9, 10, 11, 12, 13, 14, 15, 16, 17 and 18 carbon atoms, and where $R^5$ is linear or branched, and additionally, optionally has one or more alcohol, amino, ester, keto, thio, acid, urethane, urea or allophanate groups, double bonds, triple bonds or halogen atoms, or mixtures thereof;
2) catalysts of the formula $[NR^1R^2R^3R^4]^+[R^5]^-$, where $R^1$ to $R^4$ are each independently an alkyl, aryl, aralkyl, heteroaryl or alkoxyalkyl radical having 1 to 18 carbon atoms, including, but not limited to, radicals having 1, 2, 3, 4, 5, 6, 7, 8, 9, 10, 11, 12, 13, 14, 15, 16, 17 and 18 carbon atoms, and in each case are independently linear or branched, unbridged or bridged with one or more other radicals $R^1$, $R^2$, $R^3$ and $R^4$, to form a monocyclic, bicyclic or tricyclic system, and where the bridging atom(s) optionally include not only carbon, but also heteroatoms, and additionally, each radical $R^1$, $R^2$, $R^3$ and $R^4$, optionally has one or more alcohol, amino, ester, keto, thio, acid, urethane, urea or allophanate groups, double bonds, triple bonds or halogen atoms, or mixtures thereof; and where $R^5$ is either OH or F;
3) catalysts of the formula $M(OR^1)_n(OR^2)_m(OR^3)_o(OR^4)_p(OR^5)_q(OR^6)_r$, where M is a metal in any positive oxidation state, and is identical to the sum n+m+o+p+q+r, where each of n, m, o, p, q, and r is an integer from 0 to 6, such that the sum n+m+o+p+q+r=1 to 6, and where the radicals $R^1$ to $R^6$ are each independently, hydrogen or an alkyl, aryl, aralkyl, heteroaryl or alkoxyalkyl radical having 1 to 8 carbon atoms, including, but not limited to, radicals having 1, 2, 3, 4, 5, 6, 7 and 8 carbon atoms, and where the radicals may independently be linear or branched, unbridged or bridged with one or more other radicals, $R^1$, $R^2$, $R^3$, $R^4$, $R^5$ and $R^6$, to form a monocyclic, bicyclic or tricyclic system, and where the bridging atom(s) may optionally, in addition to carbon, also be heteroatoms, and wherein each of $R^1$, $R^2$, $R^3$, $R^4$, $R^5$ and $R^6$, optionally has one or more alcohol, amino, ester, keto, thio, acid, urethane, urea or allophanate groups, double bonds, triple bonds or halogen atoms, or mixtures thereof; and
4) mixtures thereof;

C) optionally, at least one hydroxyl-containing polymer having an OH number between about 20 and about 500 mg KOH/gram, at least one amino-containing polymer having a comparable amine content, or mixtures thereof;

D) optionally, at least one compound which is reactive toward acid groups and has a weight fraction, based on the total formulation or composition, from about 0.1% to about 10%;

E) optionally, one or more acids in monomeric form, polymeric form, or mixture thereof, in a weight fraction, based on the total formulation or composition, from about 0.1% to about 10%; and F) optionally, one or more auxiliaries, additives, or mixtures thereof; and where the fraction of the one or more catalyst under B) is from about 0.001% to about 5%, by weight of the total amount of the components, and where the composition has a melting point above about 40° C., including all temperatures around and above 40° C.

The two components A), and, when present, C), are present in a proportion, such that for each hydroxyl and/or amine group of component C), there is more than 1 uretdione group of component A).

Optionally the catalysts from the above groups 1 to 4 can be surrounded by, or mixed within, an inert shell, and hence encapsulated.

Although the compositions of the invention can be cured at higher temperatures, the compositions provide for highly reactive or low temperature curing systems, that can be cured at temperatures below 180° C., including all temperatures and temperature ranges below 180° C. In one embodiment, the curing temperature is within the range of about 60° C. to about 220° C., including all subranges and all individual temperatures within (including subranges and values between endpoints or including an endpoint) this range. In one embodiment, curing times ranging from about 4 to about 60 minutes are used, including all subranges and individual time periods within (including subranges and values between endpoints or including an endpoint) about 4 to about 60 minutes.

The invention also provides for polyurethane compositions for coatings on metal, plastic, glass, wood or leather substrates, other heat-resistant substrates, or combinations thereof. In addition, the invention provides for polyurethane compositions for producing adhesive bonds on metal, plastic, glass, wood or leather substrates, other heat-resistant substrates, or combinations thereof. The compositions of the invention are particularly useful as metal-coating compositions, particularly for automobile bodies, motorbikes and cycles, architectural components and household appliances, and as wood-coating compositions, glass-coating compositions, leather-coating compositions, and plastics-coating compositions.

Polyisocyanates containing uretdione groups are well known, and are described in, for example, U.S. Pat. No. 4,476,054; U.S. Pat. No. 4,912,210; U.S. Pat. No. 4,929,724 and EP 0 417 603 (all of which are incorporated herein by reference). A comprehensive overview of industrially relevant processes for dimerizing isocyanates to uretdiones is offered by J. Prakt. Chem. 336 (1994) 185-200, which is incorporated herein by reference. Conversion of isocyanates to uretdiones takes place generally in the presence of soluble dimerization catalysts, such as dialkylaminopyridines, trialkylphosphines, phosphoramides or imidazoles, for example. The reaction, conducted optionally in solvents, but preferably in their absence, is terminated by the addition of catalyst poisons when a desired conversion has been reached. Excess monomeric isocyanate is then removed by short-path evaporation. If the catalyst is sufficiently volatile, the reaction mixture can be freed from the catalyst at the same time as the monomer is removed. In this case there is no need to add catalyst poisons.

A broad range of isocyanates is suitable in principle for the preparation of polyisocyanates containing uretdione groups. Preferred polyisocyanates include, but are not limited to, isophorone diisocyanate (IPDI); hexamethylene diisocyanate (HDI); 2-methylpentane diisocyanate (MPDI); 2,2,4-trimethylhexamethylene diisocyanate/2,4,4-trimethylhexamethylene diisocyanate (TMDI); norbornane diisocyanate (NBDI); methylenediphenyl diisocyanate (MDI) and tetramethylxylylene diisocyanate (TMXDI). Particular preference is given to IPDI and HDI. These polyisocyanates can be used as starting materials for component A), and mixtures of these polyisocyanates may be used.

The conversion of polyisocyanates bearing uretdione groups to curing agents A) containing uretdione groups, involves the reaction of the free NCO groups with hydroxyl-containing compounds, which include monomers, polymers, or mixtures thereof. Examples of such compounds include, but are not limited to, polyesters, polythioethers, polyethers, polycaprolactams, polyepoxides, polyesteramides, polyurethanes or low molecular mass di-, tri- and/or tetraalcohols as chain extenders, and if desired, monoamines and/or monoalcohols as chain terminators, and which has already been frequently described (EP 0 669 353, EP 0 669 354, DE 30 30 572, EP 0 639 598 or EP 0 803 524, all of which are herein incorporated by reference). The hydroxyl-containing compounds can be used as starting materials for component A), and mixtures of these compounds may be used.

Preferred curing agents A) containing uretdione groups, have a free NCO content less than about 5% by weight, and including all amounts around this value and less than this value, and a uretdione group content from about 1% to about 18% by weight, and including all amounts around and within these values (calculated as $C_2N_2O_2$, molecular weight 84). Preference is given to polyesters and monomeric dialcohols. The curing agents may also contain isocyanurate, biuret, allophanate, urethane, urea structures, or combinations thereof, in addition to the uretdione groups.

The invention also provides for one or more catalysts, and the use of such catalysts in the preparation of polyurethane compositions; such catalyst are selected from the group consisting of 1) catalysts of the formula $[NR^1R^2R^3R^4]^+[R^5COO]^-$, where $R^1$ to $R^4$ are each independently, an alkyl, aryl, aralkyl, heteroaryl or alkoxyalkyl radical having 1 to 18 carbon atoms, including, but not limited to, radicals having 1, 2, 3, 4, 5, 6, 7, 8, 9, 10, 11, 12, 13, 14, 15, 16, 17 and 18 carbon atoms, and in each case are independently linear or branched, unbridged or bridged with one or more other radicals $R^1$, $R^2$, $R^3$ and $R^4$, to form a monocyclic, bicyclic or tricyclic system, and where the bridging atom(s) optionally include not only carbon, but also heteroatoms, and additionally, each radical $R^1$, $R^2$, $R^3$ and $R^4$ optionally has one or more alcohol, amino, ester, keto, thio, urethane, urea or allophanate groups, double bonds, triple bonds or halogen atoms, or mixtures thereof; and where $R^5$ is an alkyl, aryl, aralkyl, heteroaryl or alkoxyalkyl radical having 1 to 18 carbon atoms, including, but not limited to, 1, 2, 3, 4, 5, 6, 7, 8, 9, 10, 11, 12, 13, 14, 15, 16, 17 and 18 carbon atoms, and where $R^5$ is linear or branched, and additionally, optionally has one or more alcohol, amino, ester, keto, thio, acid, urethane, urea or allophanate groups, double bonds, triple bonds or halogen atoms, or mixtures thereof;

2) catalysts of the formula $[NR^1R^2R^3R^4]^+[R^5]^-$, where $R^1$ to $R^4$ are each independently an alkyl, aryl, aralkyl, heteroaryl or alkoxyalkyl radical having 1 to 18 carbon atoms, including, but not limited to, radicals having 1, 2, 3, 4, 5, 6, 7, 8, 9, 10, 11, 12, 13, 14, 15, 16, 17 and 18 carbon atoms, and in each case are independently linear or branched, unbridged or bridged with one or more other radicals $R^1$, $R^2$, $R^3$ and $R^4$, to form a monocyclic, bicyclic or tricyclic system, and where the bridging atom(s) optionally include not only carbon, but also heteroatoms, and additionally, each radical $R^1$, $R^2$, $R^3$ and $R^4$, optionally has one or more alcohol, amino, ester, keto, thio, acid, urethane, urea or allophanate groups, double bonds, triple bonds or halogen atoms, or mixtures thereof; and $R^5$ is either OH or F;

3) catalysts of the formula $M(OR^1)_n(OR^2)_m(OR^3)_o(OR^4)_p(OR^5)_q(OR^6)_r$, where M is a metal in any positive oxidation state, and is identical to the sum n+m+o+p+q+r, where each of n, m, o, p, q, and r is an integer from 0 to 6, and the sum n+m+o+p+q+r=1 to 6, and where the radicals $R^1$ to $R^6$ are each independently, hydrogen or an alkyl, aryl, aralkyl, heteroaryl or alkoxyalkyl radical having 1 to 8 carbon atoms, including, but not limited to, radicals having 1, 2, 3, 4, 5, 6, 7 and 8 carbon atoms, and where the radicals may independently be linear or branched, unbridged or bridged with one or more other radicals, $R^1$, $R^2$, $R^3$, $R^4$, $R^5$ and $R^6$, to form a monocyclic, bicyclic or tricyclic system, and the bridging atom(s) may optionally, in addition to carbon, also be heteroatoms, and wherein each of $R^1$, $R^2$, $R^3$, $R^4$, $R^5$ and $R^6$, optionally has one or more alcohol, amino, ester, keto, thio, acid, urethane, urea or allophanate groups, double bonds, triple bonds or halogen atoms, or mixtures thereof; and 4) mixtures thereof.

The above catalyst may be present in polyurethane coating compositions and adhesive compositions. These catalysts can be combined with component A) as discussed above, or other polyurethane resins. Cured compositions formed from component A) and the catalysts of component B), and optionally from one or more of the components C) through F), are also included in the present invention.

The catalysts B) of the present invention satisfy 1) catalysts of the formula $[NR^1R^2R^3R^4]^+[R^5COO]^-$, where $R^1$ to $R^4$ are each independently, an alkyl, aryl, aralkyl, heteroaryl or alkoxyalkyl radical having 1 to 18 carbon atoms, including, but not limited to, radicals having 1, 2, 3, 4, 5, 6, 7, 8, 9, 10, 11, 12, 13, 14, 15, 16, 17 and 18 carbon atoms, and in each case are independently linear or branched, unbridged or bridged with one or more other radicals $R^1$, $R^2$, $R^3$ and $R^4$, to form a monocyclic, bicyclic or tricyclic system, and where the bridging atom(s) optionally include not only carbon, but also heteroatoms, and additionally, each radical $R^1$, $R^2$, $R^3$ and $R^4$ optionally has one or more alcohol, amino, ester, keto, thio, urethane, urea or allophanate groups, double bonds, triple bonds or halogen atoms, or mixtures thereof; and where $R^5$ is an alkyl, aryl, aralkyl, heteroaryl or alkoxyalkyl radical having 1 to 18 carbon atoms, including, but not limited to, 1, 2, 3, 4, 5, 6, 7, 8, 9, 10, 11, 12, 13, 14, 15, 16, 17 and 18 carbon atoms, and where $R^5$ is linear or branched, and additionally, optionally has one or more alcohol, amino, ester, keto, thio, acid, urethane, urea or allophanate groups, double bonds, triple bonds or halogen atoms, or mixtures thereof;

2) catalysts of the formula $[NR^1R^2R^3R^4]^+[R^5]^-$, where $R^1$ to $R^4$ are each independently, an alkyl, aryl, aralkyl, heteroaryl or alkoxyalkyl radical having 1 to 18 carbon atoms, including, but not limited to, one or more radicals having 1, 2, 3, 4, 5, 6, 7, 8, 9, 10, 11, 12, 13, 14, 15, 16, 17 and 18 carbon atoms, and in each case are independently linear or branched, unbridged or bridged with one or more other radicals $R^1$, $R^2$, $R^3$ and $R^4$, to form a monocyclic, bicyclic or tricyclic system, and where the bridging atom(s) optionally include not only carbon, but also heteroatoms, and additionally, each radical $R^1$, $R^2$, $R^3$ and $R^4$, optionally has one or more alcohol, amino, ester, keto, thio, acid, urethane, urea or allophanate groups, double bonds, triple bonds or halogen atoms, or mixtures thereof; and $R^5$ is either OH or F;

3) catalysts of the formula $M(OR^1)_n(OR^2)_m(OR^3)_o(OR^4)_p(OR^5)_q(OR^6)_r$, where M is a metal in any positive oxidation state, and is identical to the sum n+m+o+p+q+r, where each of n, m, o, p, q, and r is an integer from 0 to 6, such that the sum n+m+o+p+q+r=1 to 6, and where the radicals $R^1$ to $R^6$ are each independently, hydrogen or an alkyl, aryl, aralkyl, heteroaryl or alkoxyalkyl radical having 1 to 8 carbon atoms, including, but not limited to, radicals having 1, 2, 3, 4, 5, 6, 7, and 8 carbon atoms, and where the radicals may independently be linear or branched, unbridged or bridged with one or more other radicals, $R^1$, $R^2$, $R^3$, $R^4$, $R^5$ and $R^6$, to form a monocyclic, bicyclic or tricyclic system, and the bridging atom(s) may optionally, in addition to carbon, also be heteroatoms, and where each of $R^1$, $R^2$, $R^3$, $R^4$, $R^5$ and $R^6$, optionally has one or more alcohol, amino, ester, keto, thio, acid, urethane, urea or allophanate groups, double bonds, triple bonds or halogen atoms, or mixtures thereof; and 4) mixtures thereof.

Examples of above group 1 catalysts of the formula $[NR^1R^2R^3R^4]^+[R^5COO]^-$, include, but are not limited to, tetramethylammonium formate, tetramethylammonium acetate, tetramethylammonium propionate, tetramethylammonium butyrate, tetramethylammonium benzoate, tetraethylammonium formate, tetraethylammonium acetate, tetraethylammonium propionate, tetraethylammonium butyrate, tetraethylammonium benzoate, tetrapropylammonium formate, tetrapropylammonium acetate, tetrapropylammonium propionate, tetrapropylammonium butyrate, tetrapropylammonium benzoate, tetrabutylammonium formate, tetrabutylammonium acetate, tetrabutylammonium propionate, tetrabutylammonium butyrate, tetrabutylammonium benzoate, and mixtures thereof.

Examples of above group 2 catalysts of the formula $[NR^1R^2R^3R^4]^+[R^5]^-$, include, but are not limited to, methyltributylammonium hydroxide, methyltriethylammonium hydroxide, tetramethylammonium hydroxide, tetraethylammonium hydroxide, tetrapropylammonium hydroxide, tetrabutylammonium hydroxide, tetrapentylammonium hydroxide, tetrahexylammonium hydroxide, tetraoctylammonium hydroxide, tetradecylammonium hydroxide, tetradecyltrihexylammonium hydroxide, tetraoctadecylammonium hydroxide, benzyltrimethylammonium hydroxide, benzyltriethylammonium hydroxide, trimethylphenylammonium hydroxide, triethylmethylammonium hydroxide, trimethylvinylammonium hydroxide, tetramethylammonium fluoride, tetraethylammonium fluoride, tetrabutylammonium fluoride, tetraoctylammonium fluoride, benzyltrimethylammonium fluoride and mixtures thereof.

Examples of above group 3 catalysts of the formula $M(OR^1)_n(OR^2)_m(OR^3)_o(OR^4)_p(OR^5)_q(OR^6)_r$, include, but are not limited to, lithium hydroxide, sodium hydroxide, potassium hydroxide, rubidium hydroxide, cesium hydroxide, beryllium hydroxide, magnesium hydroxide, calcium hydroxide, strontium hydroxide, barium hydroxide, aluminum hydroxide, zinc hydroxide, lithium methoxide, sodium methoxide, potassium methoxide, magnesium methoxide, calcium methoxide, barium methoxide, lithium ethoxide, sodium ethoxide, potassium ethoxide, magnesium ethoxide, calcium ethoxide, barium ethoxide, lithium propoxide, sodium propoxide, potassium propoxide, magnesium propoxide, calcium propoxide, barium propoxide, lithium isopropoxide, sodium isopropoxide, potassium isopropoxide, magnesium isopropoxide, calcium isopropoxide, barium isopropoxide, lithium 1-butoxide, sodium 1-butoxide, potassium 1-butoxide, magnesium 1-butoxide, calcium 1-butoxide, barium 1-butoxide, lithium 2-butoxide, sodium 2-butoxide, potassium 2-butoxide, magnesium 2-butoxide, calcium 2-butoxide, barium 2-butoxide, lithium isobutoxide, sodium isobutoxide, potassium isobutoxide, magnesium isobutoxide, calcium isobutoxide, barium isobutoxide, lithium tert-butoxide, sodium tert-butoxide, potassium tert-butoxide, magnesium tert-butoxide, calcium tert-butoxide, barium tert-butoxide, lithium phenoxide, sodium phenoxide, potassium phenoxide, magnesium phenoxide, calcium phenoxide, barium phenoxide, and mixtures thereof.

As discussed above, mixtures of group 1, 2 and 3 catalysts may also be used. In one embodiment of the invention, the catalyst(s) are present in an amount of from about 0.001% to about 5% by weight, preferably from about 0.01% to about 3% by weight, based on the total amount of the components in the polyurethane composition. The catalysts may also be used in amounts that include all amounts around and within about 0.001% to about 5%, by weight, based on the total amount of the components in the polyurethane composition.

The catalysts may include water of crystallization, in which case such water is not taken into account when calculating the amount of catalyst used; that is, the amount of water is removed from the calculation. In a preferred embodiment of the invention, tetraethylammonium benzoate, tetrabutylammonium hydroxide, or a mixture thereof, is used as the catalyst system.

In another embodiment of the invention, the one or more catalysts B) are bound, preferably by chemical bonding, or another chemical interaction, to the coatings or adhesives curing agent A), and/or to hydroxyl-containing polymers C). For example, free alcohol, thio or amino groups of the ammonium salts can be reacted with acid, isocyanate or gycidyl groups of the powder coatings curing agents A), or hydroxyl-containing polymers C), in order to integrate the catalysts B) into the polymeric system.

The hydroxyl- or amino-containing polymers C) include, but are not limited to, polyesters, polyethers, polyacrylates, polyurethanes, polyamidoamines and/or polycarbonates. These polymers have an OH number of from about 20 to about 500 (in mg KOH/gram), and including all amounts around and within this range, or a comparable amine content. Particular preference is given to polyesters having an OH number of from about 30 to about 150, and an average molecular weight of from about 500 to about 6000 g/mol, including all molecule weights within this range and around this range. Preferred average molecular weights for the polymers, in general, range from about 301 to about 8,000 g/mol, including all molecular weights within this range and around this range. Such binders have been described in, for example, EP 0 669 354 and EP 0 254 152, both of which are herein incorporated by reference. Mixtures of such polymers may also be used. The phrase "within this range," or similar phrases, as used throughout the present application, may include an endpoint of the specified range.

It should be borne in mind in this context, that the activity of the catalysts is significantly decreased in the presence of acids. The conventional reaction partners of the uretdione-containing coatings or adhesives curing agents include hydroxyl-containing polyesters. Because of the way in which polyesters are prepared, they occasionally still include acid groups to a small extent. The acid group content of the polyesters ought to be below 20 mg KOH/g, since otherwise, the catalysts are excessively inhibited. In the presence of polyesters which carry such acid groups, it is appropriate either to use the catalysts mentioned, in excess, relative to the acid groups, or else to add reactive compounds which are capable of scavenging acid groups. Both monofunctional and polyfunctional compounds can be used for this purpose. The possible crosslinking effect of the polyfunctional compounds, although unwanted in view of the viscosity-increasing effect, generally causes no disturbance, owing to the low concentration of these compounds.

Reactive acid-scavenging compounds of component D) are common knowledge in paint chemistry, and include, but are not limited to, epoxy compounds; carbodiimides; hydroxyalkylamides; 2-oxazolines; inorganic salts, such as hydroxides, hydrogencarbonates or carbonates, which react with acid groups at elevated temperatures, or mixtures thereof. Suitable examples include, but are not limited to, triglycidyl ether isocyanurate (TGIC), EPIKOTE® 828 (diglycidyl ether of bisphenol A, Shell), Versatic acid glycidyl esters, ethylhexyl glycidyl ether, butyl glycidyl ether, Polypox R 16 (pentaerythritol tetraglycidyl ether, UPPC AG), and other Polypox grades containing free epoxy groups, Vestagon EP HA 320 (a hydroxyalkylamide, Degussa AG), and also phenylenebisoxazoline, 2-methyl-2-oxazoline, 2-hydroxyethyl-2-oxazoline, 2-hydroxypropyl-2-oxazoline, 5-hydroxypentyl-2-oxazoline, sodium carbonate, and calcium carbonate. Mixtures of such substances are also suitable. These reactive compounds can be used in weight fractions of from about 0.1% to about 10%, preferably from about 0.5% to about 3%, based on the total weight of the formulation or composition. These reactive compounds may also be used in weight fractions that include all amounts around and within about 0.1% to about 10%, based on the total weight of the formulation or composition.

Acids specified under component E) are all substances, solid or liquid, organic or inorganic, monomeric, polymeric, or mixtures thereof, which possess the properties of a Brönsted acid or a Lewis acid. Examples include, but are not limited to, sulfuric acid, acetic acid, benzoic acid, malonic acid, and terephthalic acid, and also copolyesters or copolyamides having an acid number of at least about 20, including all numbers above, and around 20.

For coatings or adhesives production, it is possible to add one or more auxiliaries or additives (component F) customary in coatings or adhesives technology; for example, leveling agents, e.g., polysilicones or acrylates; light stabilizers, e.g., sterically hindered amines; or other auxiliaries, as described in EP 0 669 353 (incorporated herein by reference), for example, in a total amount of from about 0.05% to about 5% by weight, and including all amounts around and within these values, based on the weight of the total composition. Fillers and pigments, such as titanium dioxide, for example, can be added in an amount up to about 50% by weight, including all amounts around and below 50%, of the total composition. Mixtures of such substances are also suitable.

Optionally one or more additional catalysts, such as those already known in polyurethane chemistry may be present. These include, but are not limited to, primarily organometallic catalysts, such as dibutyltin dilaurate, or tertiary amines, such as 1,4-diazabicyclo[2.2.2]octane, for example, in amounts of from about 0.001% to about 1% by weight of the total composition. All amounts around and within about 0.001 to about 1% are also included.

In one embodiment of the invention, the polyurethane composition, as discussed above, can be prepared in a heatable apparatus at temperatures below about 130° C. In another embodiment of the invention, all of the constituents for preparing the polyurethane composition, can be homogenized in suitable apparatus, such as heatable stirred tanks, kneading apparatus or extruders, for example, in which upper temperature limits of 120 to 130° C. ought not to be exceeded. After the constituents have been thoroughly mixed, the composition is applied to the substrate by appropriate techniques, such as rolling or spraying. Application of ready-to-spray powders to suitable substrates can take place by known methods, such as by electrostatic powder spraying or by fluid-bed sintering, electrostatically, or otherwise. The application step is followed by heating the coated work pieces to cure the composition. In a preferred embodiment of the invention, the work pieces are heated for about 4 to about 60 minutes, at a temperature of about 60 to about 220° C., and preferably for about 6 to about 30 minutes at a temperature from about 80 to about 160° C. All time periods around and within about 4 to about 60 minutes, are also included in the present invention. All temperatures around and within about 60 to about 220° C., are also included in the present invention.

In one embodiment of the invention, the polyurethane composition, as discussed above, is used as a coating on metal, plastic, glass, wood, leather substrates, other heat-resistant substrates, or combinations thereof. The polyurethane coating composition may be in the form of a powder. In another embodiment of the invention, the polyurethane composition is used to produce adhesive bonds on metal, plastic, glass, wood, leather substrates, other heat-resistant substrates, or combinations thereof. The invention also relates to products or articles containing the polyurethane composition coated onto metal, wood, glass, leather or plastics substrates, other heat-resistant substrates, or combinations thereof.

Having generally described this invention, a further understanding can be obtained by reference to certain specific examples, which are provided herein for purposes of illustration only, and are not intended to be limiting, unless otherwise specified.

EXAMPLES

| Ingredients | Product description, manufacturer |
|---|---|
| VESTAGON BF 1320 | powder coating curing agent, Degussa AG, Coatings & Colorants, uretdione content: 13.5%, m.p.: 90-115° C., $T_g$: 79° C. |
| TBAB | tetrabutylammonium benzoate, Aldrich |
| RESIFLOW PV 88 | leveling agent, Worlee | m.p.: melting point
$T_g$: glass transition point

Polyurethane compositions [powder coating material] (amounts in % by weight):

| Example | VESTAGON BF 1320 | Resiflow PV 88 | TBAB |
|---|---|---|---|
| 1 | 98.5 | 1 | 0.5 |
| C1* | 99 | 1 | — |

*noninventive, comparative example

Representative Preparation for the Powder Coatings:

The comminuted ingredients—powder coating curing agent, catalysts, and leveling agent—were intimately mixed in an edge runner mill, and then homogenized in an extruder at 130° C. maximum temperature. The extrudate was cooled, fractionated, and ground to a particle size <100 μm with a pinned-disk mill. Using an electrostatic powder spraying unit, the powder thus prepared was applied at 60 kV to degreased iron panels, and cured, in a forced-air oven at 150° C. for 30 minutes (film thickness: 70 to 80 μm).

| Example | MEK test[1] | Pendulum hardness[2] | Remarks |
|---------|-------------|----------------------|---------|
| 1 | >100 | 208 | cured |
| C1* | 6 | not measurable | not cured |

[1]MEK test: A hammer weighing 2 kg is wrapped in a cotton pad that has previously been saturated with MEK (methyl ethyl ketone). The hammer is then pulled forward and back in double rubs, until visible attack is evident on the lacquer.
[2]Pendulum hardness: DIN EN ISO 1522.

The present application claims priority to German patent application 103 46 958.3, filed Oct. 9, 2003, which is herein incorporated in its entirety by reference.

Obviously, additional modifications and variations of the present invention are possible in light of the above teachings. It is therefore to be understood that within the scope of the appended claims, the invention may be practiced otherwise, than as specifically described herein.

What is claimed is:

1. A curable polyurethane composition, comprising:
   A) at least one curing agent which contains uretdione groups and is derived from aliphatic, (cyclo)aliphatic, cycloaliphatic, or aromatic polyisocyanates, or mixtures thereof, and one or more hydroxyl-containing compounds, and has a free NCO content of less than about 5% by weight, based on the total weight of component A), and a uretdione content of from about 1% to about 18% by weight, based on the total weight of component A);
   B) one or more catalysts selected from the group consisting of
      1) catalysts of the formula $[NR^1R^2R^3R^4]^+[R^5COO]^-$, wherein $R^1$ to $R^4$ are each independently, an alkyl, aryl, aralkyl, heteroaryl or alkoxyalkyl radical having 1 to 18 carbon atoms, and in each case are independently linear or branched, unbridged or bridged with one or more other radicals $R^1$, $R^2$, $R^3$ and $R^4$, to form a monocyclic, bicyclic or tricyclic system, and wherein the bridging atom(s) optionally include not only carbon, but also heteroatoms, and additionally, each radical $R^1$, $R^2$, $R^3$ and $R^4$, optionally has one or more alcohol, amino, ester, keto, thio, urethane, urea or allophanate groups, double bonds, triple bonds or halogen atoms, or mixtures thereof; and wherein $R^5$ is an alkyl, aryl, aralkyl, heteroaryl or alkoxyalkyl radical having 1 to 18 carbon atoms, and is linear or branched, and additionally, optionally has one or more alcohol, amino, ester, keto, thio, acid, urethane, urea or allophanate groups, double bonds, triple bonds or halogen atoms, or mixtures thereof;
      2) catalysts of the formula $[NR^1R^2R^3R^4]^+[R^5]^-$, wherein $R^1$ to $R^4$ are each independently, an alkyl, aryl, aralkyl, heteroaryl or alkoxyalkyl radical having 1 to 18 carbon atoms, and in each case are independently linear or branched, unbridged or bridged with one or more other radicals $R^1$, $R^2$, $R^3$ and $R^4$, to form a monocyclic, bicyclic or tricyclic system, and wherein the bridging atom(s) optionally include not only carbon, but also heteroatoms, and additionally, each radical $R^1$, $R^2$, $R^3$ and $R^4$, optionally has one or more alcohol, amino, ester, keto, thio, acid, urethane, urea or allophanate groups, double bonds, triple bonds or halogen atoms, or mixtures thereof and wherein $R^5$ is either OH or F;
      3) catalysts of the formula $M(OR^1)_n(OR^2)_m(OR^3)_o(OR^4)_p(OR^5)_q(OR^6)_r$, wherein M is a metal in any positive oxidation state, and is identical to the sum n+m+o+p+q+r, and wherein each of n, m, o, p, q, and r is an integer from 0 to 6, such that the sum n+m+o+p+q+r=1 to 6, and wherein the radicals $R^1$ to $R^6$ are each independently, hydrogen or an alkyl, aryl, aralkyl, heteroaryl or alkoxyalkyl radical having 1 to 8 carbon atoms, and wherein the radicals are independently linear or branched, unbridged or bridged with one or more other radicals, $R^1$, $R^2$, $R^3$, $R^4$, $R^5$ and $R^6$, to form a monocyclic, bicyclic or tricyclic system, and wherein the bridging atom(s) may optionally, in addition to carbon, also be heteroatoms, and wherein each of $R^1$, $R^2$, $R^3$, $R^4$, $R^5$ and $R^6$, optionally has one or more alcohol, amino, ester, keto, thio, acid, urethane, urea or allophanate groups, double bonds, triple bonds or halogen atoms, or mixtures thereof;
      4) and mixtures thereof;
   C) optionally, at least one hydroxyl-containing polymer having an OH number between about 20 and 500 mg KOH/gram, at least one amino-containing polymer of comparable amine content, or mixtures thereof;
   D) optionally, at least one compound which is reactive toward acid groups, and has a weight fraction, based on the total composition, from about 0.1% to about 10%;
   E) optionally one or more acids in monomeric form, polymeric form, or mixtures thereof, in a weight fraction, based on the total composition, from about 0.1% to about 10%; and
   F) optionally one or more auxiliaries, additives, or mixtures thereof; and
   wherein the fraction of the one or more catalysts under B) is from about 0.001% to about 5% by weight, based on the total amount of the components, and
   wherein the composition has a melting point above about 40° C., and
   wherein components A), and, when present, C) are present in a proportion, such that for each hydroxyl and/or amine group of component C), there is more than 1 uretdione group of component A).

2. The composition of claim 1, wherein the one or more catalysts are surrounded by, or mixed within, an inert shell.

3. The composition of claim 1, wherein the polyisocyanates of component A) are selected from isophorone diisocyanate (IPDI), hexamethylene diisocyanate (HDI), 2-methylpentane diisocyanate (MPDI), 2,2,4-trimethylhexamethylene diisocyanate/2,4,4-trimethylhexamethylene diisocyanate (TMDI), norbornane diisocyanate (NBDI), methylenediphenyl diisocyanate (MDI), tetramethylxylylene diisocyanate (TMXDI) or mixtures thereof.

4. The composition of claim 3, wherein the polyisocyanate is selected from IPDI, HDI, or mixtures thereof.

5. The composition of claim 1, wherein the hydroxyl-containing compounds of component A) are selected from hydroxyl-containing monomers, hydroxyl-containing polymers, or mixtures thereof.

6. The composition of claim 5, wherein the hydroxyl-containing compounds are selected from polythioethers; polyethers; polycaprolactams; polyepoxides; polyesteramides; polyurethanes; low molecular mass di-, tri or tetraalcohols as chain extenders; or mixtures thereof.

7. The composition of claim 6, wherein the hydroxyl-containing compounds further comprise monoamines, monoalcohols, or mixtures thereof, as chain terminators.

8. The composition of claim 1, wherein the at least one curing agent A) has a free NCO content of less than about 2% by weight, and a uretdione group content of from about 1% to about 18% by weight (calculated as $C_2N_2O_2$, molecular weight 84).

9. The composition of claim 1, wherein the at least one curing agent A) further contains one or more structures selected from isocyanurate, biuret, allophanate, urethane, urea, or combinations thereof.

10. The composition of claim 1, wherein the group 1 catalysts of formula $[NR^1R^2R^3R^4]^+[R^5COO]^-$, are present and are selected from tetramethylammonium formate, tetramethylammonium acetate, tetramethylammonium propionate, tetramethylammonium butyrate, tetramethylammonium benzoate, tetraethylammonium formate, tetraethylammonium acetate, tetraethylammonium propionate, tetraethylammonium butyrate, tetraethylammonium benzoate, tetrapropylammonium formate, tetrapropylammonium acetate, tetrapropylammonium propionate, tetrapropylammonium butyrate, tetrapropylammonium benzoate, tetrabutylammonium formate, tetrabutylammonium acetate, tetrabutylammonium propionate, tetrabutylammonium butyrate, tetrabutylammonium benzoate, or mixtures thereof.

11. The composition of claim 1, wherein the group 2 catalysts of the formula $[NR^1R^2R^3R^4]^+[R^5]^-$, are present and are selected from methyltributylammonium hydroxide, methyltriethylammonium hydroxide, tetramethylammonium hydroxide, tetraethylammonium hydroxide, tetrapropylammonium hydroxide, tetrabutylammonium hydroxide, tetrapentylammonium hydroxide, tetrahexylammonium hydroxide, tetraoctylammonium hydroxide, tetradecylammonium hydroxide, tetradecyltrihexylammonium hydroxide, tetraoctadecylammonium hydroxide, benzyltrimethylammonium hydroxide, benzyltriethylammonium hydroxide, trimethylphenylammonium hydroxide, triethylmethylammonium hydroxide, trimethylvinylammonium hydroxide, tetramethylammonium fluoride, tetraethylammonium fluoride, tetrabutylammonium fluoride, tetraoctylammonium fluoride, benzyltrimethylammonium fluoride, or mixtures thereof.

12. The composition of claim 1, wherein the group 3 catalysts of the formula $M(OR^1)_n(OR^2)_m(OR^3)_o(OR^4)_p(OR^5)_q(OR^6)_r$, are present and are selected from lithium hydroxide, sodium hydroxide, potassium hydroxide, rubidium hydroxide, cesium hydroxide, beryllium hydroxide, magnesium hydroxide, calcium hydroxide, strontium hydroxide, barium hydroxide, aluminum hydroxide, zinc hydroxide, lithium methoxide, sodium methoxide, potassium methoxide, magnesium methoxide, calcium methoxide, barium methoxide, lithium ethoxide, sodium ethoxide, potassium ethoxide, magnesium ethoxide, calcium ethoxide, barium ethoxide, lithium propoxide, sodium propoxide, potassium propoxide, magnesium propoxide, calcium propoxide, barium propoxide, lithium isopropoxide, sodium isopropoxide, potassium isopropoxide, magnesium isopropoxide, calcium isopropoxide, barium isopropoxide, lithium 1-butoxide, sodium 1-butoxide, potassium 1-butoxide, magnesium 1-butoxide, calcium 1-butoxide, barium 1-butoxide, lithium 2-butoxide, sodium 2-butoxide, potassium 2-butoxide, magnesium 2-butoxide, calcium 2-butoxide, barium 2-butoxide, lithium isobutoxide, sodium isobutoxide, potassium isobutoxide, magnesium isobutoxide, calcium isobutoxide, barium isobutoxide, lithium tert-butoxide, sodium tert-butoxide, potassium tert-butoxide, magnesium tert-butoxide, calcium tert-butoxide, barium tert-butoxide, lithium phenoxide, sodium phenoxide, potassium phenoxide, magnesium phenoxide, calcium phenoxide, barium phenoxide, or mixtures thereof.

13. The composition of claim 1, wherein the one or more catalysts are selected from tetraethylammonium benzoate, tetrabutylammonium hydroxide, or mixtures thereof.

14. The composition of claim 13, wherein the one or more catalysts are present in an amount from about 0.001% to about 5% by weight, based on the total amount of the components.

15. The composition of claim 1, wherein the at least one hydroxyl-containing or amino-containing polymer of component C) is selected from polyesters, polyethers, polyacrylates, polyurethanes, polyamidoamines, polycarbonates, or mixtures thereof, and wherein the respective polymers have an OH number of from about 20 to about 500 (in mg KOH/gram) or a comparable amine content.

16. The composition of claim 15, wherein the at least one hydroxyl-containing polymer is selected from polyesters having an OH number of from about 30 to about 150, and an average molecular weight of from about 500 to about 6000 g/mol.

17. The composition of claim 1, wherein the at least one compound reactive toward acid groups of component D) is present and is selected from epoxy compounds; carbodiimides; hydroxyalkylamides; 2-oxazolines; inorganic salts, such as hydroxides, hydrogencarbonates and/or carbonates, or mixtures thereof.

18. The composition of claim 17, wherein the at least one compound reactive toward acid groups of component D) is selected from triglycidyl ether isocyanurate (TGIC), EPIKOTE® 828 (diglycidyl ether of bisphenol A, Shell), Versatic acid glycidyl esters, ethylhexyl glycidyl ether, butyl glycidyl ether, Polypox R 16 (pentaerythritol tetraglycidyl ether, UPPC AG), hydroxyalkylamide, phenylenebisoxazoline, 2-methyl-2-oxazoline, 2-hydroxyethyl-2-oxazoline, 2-hydroxypropyl-2-oxazoline, 5-hydroxypentyl-2-oxazoline, sodium carbonate, calcium carbonate, or mixtures thereof.

19. The composition of claim 1, wherein the one or more acids of component E) are present and are selected from sulfuric acid, acetic acid, benzoic acid, malonic acid, terephthalic acid, copolyesters or copolyamides having an acid number of at least about 20, or mixtures thereof.

20. The composition of claim 1, wherein the one or more auxiliaries or additives of component F) are present and are selected from leveling agents, light stabilizers, fillers, pigments, or mixtures thereof.

21. The composition of claim 1, further comprising one or more additional catalysts selected from organometallic catalysts or tertiary amines.

22. A process for preparing the polyurethane composition of claim 1, comprising heating the components of the composition of claim 1 in a heatable apparatus at temperatures below about 130° C.

23. A process for producing coatings on metal, plastic, glass, wood or leather substrates, other heat-resistant substrates, or combinations thereof, comprising applying the composition of claim 1 onto the respective substrate or substrates.

24. A process for producing adhesive bonds on metal, plastic, glass, wood, leather substrates, other heat-resistant substrates, or combinations thereof, comprising applying the composition of claim 1 onto the respective substrate or substrates.

25. An article comprising the composition of claim 1 coated onto metal wood, glass, leather or plastics substrates, or other heat-resistant substrates, or combinations thereof.

26. A polyurethane powder coating composition or adhesive composition comprising the polyurethane composition of claim 1 and one or more additives.

27. A cured composition, prepared from a composition comprising:
- A) at least one curing agent which contains uretdione groups and is derived from aliphatic, (cyclo)aliphatic, cycloaliphatic, or aromatic polyisocyanates, or mixtures thereof, and one or more hydroxyl-containing compounds, and has a free NCO content of less than about 5% by weight, based on the total weight of component A), and a uretdione content of from about 1% to about 18% by weight, based on the total weight of component A);
- B) one or more catalysts selected from the group consisting of
  1) catalysts of the formula $[NR^1R^2R^3R^4]^+[R^5COO]^-$, wherein $R^1$ to $R^4$ are each independently, an alkyl, aryl, aralkyl, heteroaryl or alkoxyalkyl radical having 1 to 18 carbon atoms, and in each case are independently linear or branched, unbridged or bridged with one or more other radicals $R^1$, $R^2$, $R^3$ and $R^4$, to form a monocyclic, bicyclic or tricyclic system, and wherein the bridging atom(s) optionally include not only carbon, but also heteroatoms, and additionally, each radical $R^1$, $R^2$, $R^3$ and $R^4$, optionally has one or more alcohol, amino, ester, keto, thio, urethane, urea or allophanate groups, double bonds, triple bonds or halogen atoms, or mixtures thereof; and wherein $R^5$ is an alkyl, aryl, aralkyl, heteroaryl or alkoxyalkyl radical having 1 to 18 carbon atoms, and is linear or branched, and additionally, optionally has one or more alcohol, amino, ester, keto, thio, acid, urethane, urea or allophanate groups, double bonds, triple bonds or halogen atoms, or mixtures thereof;
  2) catalysts of the formula $[NR^1R^2R^3R^4]^+[R^5]^-$, wherein $R^1$ to $R^4$ are each independently, an alkyl, aryl, aralkyl, heteroaryl or alkoxyalkyl radical having 1 to 18 carbon atoms, and in each case are independently linear or branched, unbridged or bridged with one or more other radicals $R^1$, $R^2$, $R^3$ and $R^4$, to form a monocyclic, bicyclic or tricyclic system, and wherein the bridging atom(s) optionally include not only carbon, but also heteroatoms, and additionally, each radical $R^1$, $R^2$, $R^3$ and $R^4$, optionally has one or more alcohol, amino, ester, keto, thio, acid, urethane, urea or allophanate groups, double bonds, triple bonds or halogen atoms, or mixtures thereof; and wherein $R^5$ is either OH or F;
  3) catalysts of the formula $M(OR^1)_n(OR^2)_m(OR^3)_o(OR^4)_p(OR^5)_q(OR^6)_r$, wherein M is a metal in any positive oxidation state, and is identical to the sum $n+m+o+p+q+r$, and wherein each of n, m, o, p, q, and r is an integer from 0 to 6, such that the sum $n+m+o+p+q+r=1$ to 6, and wherein the radicals $R^1$ to $R^6$ are each independently, hydrogen or an alkyl, aryl, aralkyl, heteroaryl or alkoxyalkyl radical having 1 to 8 carbon atoms, and wherein the radicals are independently linear or branched, unbridged or bridged with one or more other radicals, $R^1$, $R^2$, $R^3$, $R^4$, $R^5$ and $R^6$, to form a monocyclic, bicyclic or tricyclic system, and wherein the bridging atom(s) may optionally, in addition to carbon, also be heteroatoms, and wherein each of $R^1$, $R^2$, $R^3$, $R^4$, $R^5$ and $R^6$, optionally has one or more alcohol, amino, ester, keto, thio, acid, urethane, urea or allophanate groups, double bonds, triple bonds or halogen atoms, or mixtures thereof;
  4) and mixtures thereof;
- C) optionally, at least one hydroxyl-containing polymer having an OH number between about 20 and 500 mg KOH/gram, at least one amino-containing polymer of comparable amine content, or mixtures thereof;
- D) optionally, at least one compound which is reactive toward acid groups, and has a weight fraction, based on the total composition, from about 0.1% to about 10%;
- E) optionally one or more acids in monomeric form, polymeric form, or mixtures thereof, in a weight fraction, based on the total composition, from about 0.1% to about 10%; and
- F) optionally one or more auxiliaries, additives, or mixtures thereof; and
wherein the fraction of the one or more catalysts under B) is from about 0.001% to about 5% by weight, based on the total amount of the components, and
wherein the composition has a melting point above about 40° C., and
wherein components A), and, when present, C) are in a proportion, such that for each hydroxyl and/or amine group of component C), there is more than 1 uretdione group of component A).

* * * * *